United States Patent
Gocek et al.

(10) Patent No.: US 9,311,346 B2
(45) Date of Patent: Apr. 12, 2016

(54) AGENT COMMUNICATION BULLETIN BOARD

(71) Applicant: International Business Machines Corporation, Armonk, NY (US)

(72) Inventors: Pawel Gocek, Krakow (PL); Jakub Kania, Bielsko-Biala (PL); Bartlomiej T. Malecki, Krakow (PL); Tomasz Stopa, Krakow (PL)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 14/037,086

(22) Filed: Sep. 25, 2013

(65) Prior Publication Data

US 2014/0089274 A1 Mar. 27, 2014

(30) Foreign Application Priority Data

Sep. 26, 2012 (GB) .................................. 1217138.5

(51) Int. Cl.
    G06F 17/30 (2006.01)
    H04L 12/24 (2006.01)
    G06F 11/07 (2006.01)

(52) U.S. Cl.
    CPC ........ *G06F 17/30312* (2013.01); *G06F 11/076* (2013.01); *G06F 11/0709* (2013.01); *G06F 11/0766* (2013.01); *H04L 41/046* (2013.01)

(58) Field of Classification Search
    CPC .................... G06F 17/30067; G06F 17/30489; G06F 3/0641; G06F 3/0608; G06F 9/52
    USPC ........................................................ 707/692
    See application file for complete search history.

(56) References Cited

U.S. PATENT DOCUMENTS

| 6,157,941 | A  |   | 12/2000 | Verkler et al. |
| 6,230,287 | B1 | * | 5/2001 | Pinard .................... G06Q 10/10 379/265.09 |
| 7,191,227 | B2 |   | 3/2007 | Lachaud et al. |
| 7,370,358 | B2 |   | 5/2008 | Ghanea-Hercock |

(Continued)

FOREIGN PATENT DOCUMENTS

WO        WO9843146 A2    10/1998

OTHER PUBLICATIONS

Intellectual Property Office Search Report, dated Jan. 11, 2013, regarding Application No. GB1217138.5, 3 pages.

(Continued)

*Primary Examiner* — Cam-Y Truong
(74) *Attorney, Agent, or Firm* — Yee & Associates, P.C.; William J. Stock

(57) ABSTRACT

A data communication system comprising a first plurality of software entities, each having a respective entity identifier and a respective plurality of characteristics, and a data repository, wherein a first software entity of the first plurality of software entities instigates establishment of a first collection of data at the data repository, the first collection of data having at least one collection identifier selected from the plurality of characteristics of the first software entity, each of a second plurality of the first plurality of software entities having a respective set of the respective plurality of characteristics that matches the at least one collection identifier instigates addition of the entity identifier of the respective software entity to the first collection of data, at least one of the second plurality of software entities instigates addition of data to the first collection of data, and at least one other of the second plurality of software entities obtains a portion of the data from the first collection of data.

10 Claims, 3 Drawing Sheets

(56) References Cited

U.S. PATENT DOCUMENTS

| | | | |
|---|---|---|---|
| 7,512,584 | B2 | 3/2009 | Keith, Jr. |
| 7,925,984 | B2 | 4/2011 | Awe et al. |
| 2003/0018792 | A1 | 1/2003 | Shiouchi et al. |
| 2005/0289439 | A1* | 12/2005 | Nerl .................. G06F 11/1012 714/763 |
| 2006/0069771 | A1 | 3/2006 | Gissel et al. |
| 2007/0027893 | A1* | 2/2007 | Gundy ................ H04L 41/5074 |
| 2010/0077008 | A1* | 3/2010 | Davis ................ G06F 17/30011 707/797 |
| 2011/0004791 | A1 | 1/2011 | Kokubu et al. |

OTHER PUBLICATIONS

Luo et al., "AGrIP: An Agent Grid Intelligent Platform for Distributed System Integration," Proceedings of the APWeb 2006 International Workshops, Jan. 2006, pp. 590-594.

McGarry, "Agent-Server Communication," dated Jan. 5, 2012, 1 page. Accessed Nov. 14, 2013, https://support.hyperic.com/display/DOCS46/Agent+-+Server+Communication.

Rothermel et al., "Mobile Agents," In: Encyclopedia of Computer Science and Technology, vol. 40, Kent et al., (Eds.), CRC Press, May 14, 1999, 19 pages.

\* cited by examiner

AGENT COMMUNICATION BULLETIN BOARD

CROSS-REFERENCE TO RELATED APPLICATION

This application claims the benefit of priority to United Kingdom Patent Application Ser. No. 1217138.5, filed on Sep. 26, 2012, the contents of which are hereby incorporated by reference.

BACKGROUND

The present disclosure is an invention disclosure relating to a data communication system, a data communication method as well as a corresponding computer program product.

It is known to deploy software entities, e.g. so-called agents, to carry out specific tasks in a computer system. Such tasks may include monitoring changes in file directories on a (client) computer and reporting changes in file inventory to another (server) computer, e.g. for the sake of ensuring that the software installed on a client computer is properly licensed. Similarly, the software entity may provide a dedicated interface between a computer peripheral, e.g. a scanner, and a (host) computer system.

The present disclosure expounds upon this background.

BRIEF SUMMARY

Loosely speaking, the present disclosure teaches a system that provides for communication between software agents by allowing any of the software agents to establish a "bulletin board," implemented e.g. by a database at a common server, with which each of the software agents may communicate. The "bulletin board" thus acts as a common data storage location for indirectly communicating with one another.

Various "bulletin boards" may be established, each relating to a different "topic." Furthermore, the "bulletin boards" may be hierarchically structured by "topic." For example, a "bulletin board" may relate to a particular operating system (e.g. Windows), a "child" "bulletin board" relating to a particular version of that operating system (e.g. Windows 7) and a "grandchild" "bulletin board" relating to a particular build of or service pack for that version of the operating system (Windows 7, Service Pack 1). The "bulletin boards" thus allow the agents to exchange information by topics and to readily find "bulletin boards" relating to topics that may be relevant/of interest to the respective agent.

Still loosely speaking, one of the agents registered with/participating in a "bulletin board" may be designated as a managing or supervisory agent and may take on management/supervisory tasks. For example, the "bulletin board" may include information about the agents that allows each respective agent to determine their peer status. Each agent may then ascertain, for instance, whether they are the most senior participant of the "bulletin board," the most senior participant being the (designated) agent that must take on the management/supervisory tasks for that bulletin board. The management/supervisory tasks may include dissolving the "bulletin board" if less than a threshold number of agents have participated in the "bulletin board" over a given period of time. Similarly, the management/supervisory tasks may include determining whether a problem reported by several agents participating in the "bulletin board" should be considered a common problem worthy of report to a user and negotiating with other "bulletin boards" re which "bulletin board" should report the problem. A server on which the "bulletin board" is operated may likewise be responsible for carrying out the management/supervisory tasks.

In one aspect, as touched upon supra, the present disclosure relates to a data communication system, e.g. to a system for communicating data between any of a plurality of software entities, e.g. between so-called "agents."

In this respect, the system may comprise a (first) plurality of software entities, e.g. software entities comprising executable code. Any (one or more or each) of the software entities may be capable of performing a limited number of distinct tasks, e.g. less than 100 tasks or less than 50 tasks. Any (one or more or each) of the software entities may be a so-called "agent." Execution of any (one or more or each) of the tasks may be dependent on one or more parameters. As such, performing a task may comprise executing a sequence of operations that may respectively receive one or more (task) parameters (or derivatives thereof) as operands. Any (one or more or each) of the software entities may be a software entity for/capable of performing software discovery. For example, any (one or more or each) of the software entities may monitor a respective (host) system for changes in the software installed on the respective (host) machine and/or collaborate with a server to maintain a catalog of software installed on respective (host) machines. Any (one or more or each) of the software entities may be capable of operation without (direct) user interaction. The software entities may perform any (one or more) of the tasks repeatedly. Any (one or more or each) of the software entities may comprise code that allows the respective software entity to decide which task(s) to execute at a given time. This decision may be dependent upon data obtained by the respective software entity, which data may comprise data indicative of an ambient operating environment of the respective software entity. Any (one or more or each) of the software entities may, in response to a request from another software entity, perform one or more tasks, e.g. tasks associated with/identified by the respective request. Any (one or more or each) of the software entities may comprise one or more components/component modules capable of/dedicated to respectively performing one or more of the tasks. The components/component modules may be interchangeable. For example, any (one or more or each) of the software entities may be capable of replacing a component (module) with a younger version of the component (module). Such replacement may be carried out on the fly.

Any (one or more or each) of the software entities may have a respective entity identifier and/or a respective plurality of characteristics. The entity identifier may uniquely identify the respective software entity, e.g. globally or within the (first) plurality of software entities. The entity identifier may be an alphanumeric string. The software entity may be "aware" of its respective entity identifier and/or characteristics. In other words, the software entity be capable of outputting data representative of its respective entity identifier and/or characteristics, e.g. in response to an identifier/characteristic inquiry. The data may represent the entity identifier and/or characteristics in a manner that is known to/interpretable by each of the (first) plurality of software entities. Each of the plurality of characteristics may be respectively representative of any one of a version of the respective software entity, a (host) operating system, an operating system version and/or a build/service pack under which the respective software entity was conceived to be operated, a version of a component (module) of the respective software entity, a (host) computing system, etc. The (host) operating system may be an operating system under which the software entity is executing. Similarly, the (host) computing system may be a computing system on which the software entity is executing.

The system may comprise a data repository. The data repository may comprise one or more storage devices that store data of the data repository. Similarly, the data repository may comprise one or more databases. The data repository may be part of a computer system, e.g. a server, comprising one or more processors that execute code that manages an input/output and/or storage of data to/in the data repository.

The system may comprise a data communication network that permits bidirectional communication between any (one or more or each) of the software entities and the data repository, e.g. via the server. The system may prohibit/restrict direct communication between any (one or more or each) of the software entities. For example, direct communication may be prohibited/restricted between software entities operating on different computers, between software entities operating under different operating systems, between software entities operating under different instances of the same operating system, between software entities located on different (virtual) networks, etc. The prohibition may be enforced by one or more components of the system, e.g. by an operating system, a network controller, etc. Any (one or more or each) of the software entities may comprise data representative of a location of the data repository/server in the network. The data may be representative of an IP address, a hostname, one or more ports, etc. of the server.

A (first) software entity of the (first) plurality of software entities may instigate establishment of a (first) collection of data at the data repository. Establishment of the (first) collection of data may be instigated e.g. by sending an establishment instruction from the (first) software entity to the data repository/server. The data repository/server may, e.g. in response to the establishment instruction, establish one or more data structures constituting the (first) collection of data in the data repository. Similarly, the data repository/server/a user may instigate establishment of a collection of data at the data repository. For example, a server/data repository may create a collection of data in reaction to communication with two or more software entities having matching characteristics (e.g. as described below). The created collection of data may be identified by the matching characteristics. Similarly, the data repository may comprise one or more preinstalled and/or permanent collections of data, e.g. a collection of data for data from any software entities that communicate with the data repository and/or a collection of data for all UNIX-based software entities that communicate with the data repository.

The (first) collection of data may be representative of a bulletin board/forum. Hereinbelow, the expression "forum" will be used as a shorthand notation for the expression "bulletin board/forum," i.e. will be used to designate both bulletin boards and forums. As such, all statements and examples hereinbelow re (a collection of data representative of) a forum apply equally to (a collection of data representative of) a bulletin board.

In this respect, the (first) collection of data may comprise data organized into one or more data structures that allow for any (one or more or all) of a (de)registration of participant entities, an input/output of messages (e.g. for the sake of exchanging messages between participant entities), identification of a managing participant (entity), a creation/deletion of topics (also known as "threads"), a grouping/input/output of messages by topic, etc. As such, the (first) collection of data may comprise data organized into one or more data structures (respectively representative of e.g. messages, threads, participants, etc.) that collectively represent a forum.

One or more forums may be (logically) organized in a hierarchical manner. In this respect, the (first) collection of data may be representative of a sub-forum of a(nother) forum. As such, the data and/or data structure representing the forums may constitute a hierarchical representation of one or more forums/sub-forums, e.g. to one another. For example, a forum may comprise three sub-forums. As known in the art, the forum would be the "parent" of the sub-forums; the sub-forums would be the "children" of the forum. The forum may be designated as a sub-forum of a collection of data as a whole. Any (one or more) of the collections of data may be a (respective) sub-forum of more than one forum/topic. As such, a thread may be "shared" by two or more forums. For example, a thread relating to a problem in communicating with a particular Mac OS application may be shared by two forums/topics relating to Mac OS 10.7.3 and Mac OS 10.7.4, respectively.

The (first) collection of data may comprise at least one collection identifier. The collection identifier(s) may uniquely identify the (first) collection of data, e.g. from other collections of data and/or from other data in the data repository. The collection identifier(s) may be selected from the plurality of characteristics of the (first) software entity. In this respect, the (first) software entity may select at least one identifier from its plurality of characteristics and communicate the at least one identifier to the data repository/server e.g. together or otherwise in conjunction with the establishment instruction.

In the case of establishment of a sub-forum, the (first) software entity may communicate the at least one collection identifier of a (parent) forum to the data repository/server e.g. together or otherwise in conjunction with the establishment instruction. The identified (parent) forum may be the (parent) forum relative to which the sub-forum is to be established as a child, i.e. as a hierarchically lower-ranking, forum, i.e. as a sub-forum. The collection identifier(s) of such a sub-forum may be designated as "tags."

The (first) software entity may instigate establishment of a (separate) collection of data at the data repository for each combination/set of its characteristics. If, for example, the (first) software entity has three characteristics $\alpha$, $\beta$, and $\gamma$, the (first) software entity may instigate establishment of seven collections of data at the data repository, namely for set $\alpha$, set $\beta$, set $\gamma$, set $\alpha\beta$, set $\alpha\gamma$, set $\beta\gamma$ and set $\alpha\beta\gamma$. In other words, if the (first) software entity has n characteristics, the (first) software entity may instigate establishment of $2^n-1$ collections of data at the data repository, each collection of data having a unique set of collection identifiers.

The data repository/server may prevent establishment of a collection of data in the data repository having a set of collection identifiers identical to the set of collection identifiers of an existing collection of data in the data repository. For example, the data repository/server may ignore/return an error message in response to such an establishment instruction.

Any (one or more or each) of the (first) plurality of software entities may instigate addition/removal of the entity identifier of the respective software entity to/from the (first) collection of data. For example, any of the (first) plurality of software entities may instigate that the entity identifier of the respective software entity is added to/removed from a list representative of participant entities with respect to the collection of data, e.g. by sending an addition/removal instruction from the respective software entity to the data repository/server e.g. including or otherwise in conjunction with the respective entity identifier. As such, any (one or more or each) of the (first) plurality of software entities may register/deregister itself as a participant entity with respect to the collection of data, e.g. as a participant of a forum represented by the collection of data. In the present disclosure, the expression "a software entity 'participating' in a collection of data" is used for the sake of brevity and may be understood in the broader sense of a software entity that has added its entity identifier to that collection of data or otherwise "registered" itself as a participant entity with respect to the collection of data/forum.

For the sake of easier reference, the software entities "participating" in the (first) collection of data are designated in the present disclosure and claims as a "second" plurality software entities.

In the case of the (first) software entity, addition of its entity identifier to the (first) collection of data may be effected as a result of instigating establishment of the (first) collection of data, e.g. as described above. Any (one or more or each or each except the (first) software entity) of the (first) plurality of software entities may instigate addition of the entity identifier of the respective software entity to the (first) collection of data in response to an invitation from the server/data repository. For example, in response to establishment of a collection of data by the server/data repository in response to an establishment instruction from a (first) software entity belonging to a plurality of software entities, the server/data repository may invite all other software entities belonging to the plurality of software entities to instigate addition of the entity identifier of the respective software entity to the established collection of data, e.g. to register as a participant of a forum represented by the established collection of data.

Any (one or more or each) of the (first) plurality of software entities may (respectively) query the data repository/server re the (inventory of) collections of data in the data repository. Such querying may be carried out at regular (user specified) intervals. For example, a software entity may inquire whether any (new) collections of data have been established (in a given time interval), may request the (respective) sets of collection identifiers of all (new) collections of data established (in a given time interval) and/or may inquire how may collections of data have a set of collection identifiers (comprising an identifier) that matches (e.g. as described infra) a set of the plurality of characteristics of the (respective) software entity. The (querying) software entity may use a result of the query to decide whether to instigate establishment of a (new) collection of data and/or to instigate "participation" in a collection of data. For example, a software entity may instigate establishment of a (new) collection of data if the software entity experiences a (new) problem and the query reveals that no collection of data exists having a set of collection identifiers (comprising an identifier) that matches a set of the plurality of characteristics of the software entity. Similarly, a software entity may instigate "participation" in a (newly established) collection of data having a set of collection identifiers that matches a set of the plurality of characteristics of the software entity.

The (second) plurality of software entities may comprise/consist of any (one or more or all) of the (first) plurality of software entities that have a respective set of the respective plurality of characteristics that matches (any (one or more or each) of) the at least one collection identifier of the collection of data to which the respective entity identifier is added. In other words, if the plurality of characteristics of a software entity belonging to the (first) plurality of software entities comprises a set of characteristics that matches (any (one or more or each) of) the at least one collection identifier of a collection of data, then that software entity may belong to the (second) plurality of software entities that add their entity identifiers to that collection of data. Indeed, the (second) plurality of software entities (for a given collection of data) may be limited to software entities that fulfill this criterion. For example, if a (first) software entity instigates establishment of a (first) collection of data having the collection identifiers $\alpha\gamma$, then software entities having $\alpha$ and $\gamma$ in their respective plurality of characteristics may instigate addition of their respective entity identifier to the (first) collection of data. In the present disclosure, the term "match" may be interpreted, inter alia, in a (narrow) sense of "identical to" and/or in a (broad) sense of "equivalent to." For example, a generic characteristic, e.g. "Windows" may be considered to match, i.e. to be equivalent to, a more specific characteristic, e.g. Windows XP. However, in the present context, matching in the sense of "equivalent to" is not limited to such a generic-specific type relationship.

Any (one or more or each) of the (second) plurality of software entities may instigate addition of data to the (first) collection of data. For example, any (one or more or each) of the software entities "participating" in a collection of data may instigate addition of data to the (respective) collection of data. The addition of data may be instigated e.g. by sending a data addition instruction from the respective (instigating) software entity to the data repository/server. The respective (instigating) software entity may communicate the data to be added together or otherwise in conjunction with the data addition instruction. The data repository/server may, e.g. in response to the data addition instruction, add the data to the (first) collection of data. The adding of data to the (first) collection of data may comprise establishing one or more data structures and/or instances of respective data structures for storing the data, e.g. in the data repository.

The data added to the (first) collection of data may be organized by topics. In this respect, a software entity, e.g. a software entity instigating an addition of data to the (first) collection of data, may instigate establishment of one or more data structures and/or instances of respective data structures in the data repository for organizing data within the (first) collection of data by topics, e.g. for associating data with a given topic. The establishment may be instigated e.g. by sending a create topic instruction from the respective (instigating) software entity to the data repository/server. The respective (instigating) software entity may communicate a topic/an identifier for a topic together or otherwise in conjunction with the create topic instruction. The data repository/server may, e.g. in response to the create topic instruction, establish one or more data structures and/or instances of respective data structures in the data repository for organizing data within the (first) collection of data by topics, e.g. for associating data with the given topic.

The respective software entity instigating an addition of data to the (first) collection of data may stipulate a topic (of the data) together or otherwise in conjunction with the data addition instruction. The stipulated topic may be a new topic or an already established topic. For example, if a software entity has received an error from a peripheral while trying to perform a task, the software entity may post a message describing that problem on a forum under the topic of "hardware problems." Similarly, the message may be posted on a thread dedicated to the specified problem. Accordingly, the data repository/server may add the data to the (first) collection of data using the stipulated topic. As such, as touched upon above, the adding of data to the (first) collection of data may comprise establishing one or more data structures and/or instances of respective data structures for storing the data by topic.

As touched upon above, the data (added to the (first) collection of data) may be representative of a problem experienced by the respective software entity. For example, the data may be representative of the fact that the respective software entity is experiencing difficulties in performing one or more of its tasks, e.g. that the task is not returning results falling within an expected range, is returning an error and/or cannot be completed for unknown reasons. The data may specific the nature of the difficulty.

Similarly, the data (added to the (first) collection of data) may be representative of circumstances surrounding such a problem. For example, the data may be representative of any of a time of the problem, software entities operating (e.g. on the (host) operating system) at the time of the problem, a hardware configuration of the (host) computing system (e.g. including peripherals), a network configuration of the (host) computing system and/or the (host) operating system, etc.

Furthermore, the data (added to the (first) collection of data) may be representative of a solution to a problem. For example, the data may indicate that an update of a software entity from one version to another version solved a specified problem.

The data repository/server may subject a software entity to an authorization procedure, e.g. as known in the art, before allowing the software entity to interact with the data repository/server/a collection of data. For example, the data repository/server may subject a software entity to an authorization procedure before allowing the software entity to instigate/perform operations on the (first) collection of data, e.g. before allowing the software entity to instigate addition of data to the (first) collection of data and/or before allowing the software entity to obtain data from the (first) collection of data.

Any (one or more or each) of the (second) plurality of software entities may obtain a portion of the data in the (first) collection of data, e.g. obtain a portion of the data added to the (first) collection of data from the (first) collection of data. Similarly, any (one or more or each) of the software entities "participating" in a collection of data may obtain a portion of the data in the (respective) collection of data, e.g. obtain, from the (respective) collection of data, a portion of the data added to the (respective) collection of data. For example, any of the (second) plurality of software entities may obtain data from the (first) collection of data added to the (first) collection of data by another of the (second) plurality of software entities. As such, the (second) plurality of software entities may exchange data via the (first) collection of data. The obtaining may be effected actively and/or passively on the part of the respective software entity. For example, the respective software entity may communicate a data request to the collection of data and receive data from the collection of data in response to the data request. Similarly, the server/data repository/another software entity may instigate a communication of data from the collection of data to the respective software entity (although the respective software entity has not actively requested the data).

As touched upon above, any (one or more or each) of the (second) plurality of software entities may instigate a removal of the entity identifier of the respective software entity from the (first) collection of data. Similarly, any (one or more or each) of the software entities "participating" in a collection of data may instigate a removal of the entity identifier of the respective software entity from the (respective) collection of data. The removal of the entity identifier may be instigated in response to a change in the respective plurality of characteristics of the respective software entity, e.g. in response to a change in the respective plurality of characteristics of the respective software entity that results in the respective software entity no longer having a set of characteristics that matches (any (one or more or each) of) the at least one collection identifier of the collection of data (from which the respective entity identifier is removed). For example, any (one or more or each) of the (second) plurality of software entities, in response to a change in its respective plurality of characteristics, e.g. in response to a change in the set of characteristics (that led to the entity identifier of the respective software entity being added to the (first) collection of data), may instigate a removal of the entity identifier of the respective software entity from the (first) collection of data if the respective set of characteristics (that led to the entity identifier of the respective software entity being added to the (first) collection of data) no longer matches the at least one collection identifier (of the (first) collection of data). As such, a software entity may (automatically) deregister from a forum, e.g. if the software entity no longer shares the characteristics of that forum, i.e. of the other software entities registered with that forum.

As touched upon above, any one of the first plurality of software entities may instigate establishment of a (second) collection of data at the data repository. For example, the first software entity may instigate establishment of a second collection of data at the data repository, the second collection of data having at least one collection identifier selected from the plurality of characteristics of the first software entity. The at least one collection identifier of the second collection of data may differ from the at least one collection identifier of the first collection of data. In other words, at least one of the collection identifiers of the second collection of data may differ from at least one of the collection identifiers of the first collection of data. The (second) collection of data may be representative e.g. of a sub-forum of a forum As touched upon above, any (one or more or each) of the (first) plurality of software entities may instigate addition/removal of the entity identifier of the respective software entity to/from the (second) collection of data. For the sake of easier reference, this "any" of the (first) plurality of software entities is designated in the present disclosure and claims as a "third" plurality software entities. Noting that the above description of the (first/second) plurality of software entities, e.g. in relationship to the (first) collection of data, is not limited to the first/second plurality of software entities and is not limited to the first collection of data, it will be understood that the above description applies mutatis mutandis to the third plurality of software entities, e.g. in relationship to the (second) collection of data. For example, the third plurality of software entities may comprise/consist of any (one or more or all) of the (first) plurality of software entities that have a respective set of the respective plurality of characteristics that matches (any (one or more or each) of) the at least one collection identifier of the collection of data to which the respective entity identifier is added.

A software entity may inform a user of a (common) problem, e.g. if a threshold number/percentage of software entities experiences the (common) problem and/or reports the (common) problem to a collection of data. The informing may be subject to elapse of a given period of time, e.g. a period of time since the problem was initially reported to the collection of data. The period of time may be specified by a user, i.e. by receiving and storing a user input indicative of the period of time. The informing may comprise communicating a list of one or more of the software entities experiencing the problem, e.g. a list of one or more or all software entities experiencing the problem and "participating" in the collection of data that is reporting the problem (e.g. as described infra).

The problem may be a problem reported to at least one forum by a plurality of software entities. For example, the problem may be a problem represented by (respective) data added to at least one collection of data, e.g. by each of a plurality of software entities. The problem may be a "common" problem in the sense that each of a plurality of software entities has experienced the problem. As such, the problem may be a "common" problem in the sense that respective data added to a collection of data by each of a plurality of software entities is representative of the same problem.

The problem may be a problem experienced by a threshold number (e.g. twenty, fifty or one hundred) and/or a threshold percentage (e.g. at least 50%, at least 75% or at least 90%) of the software entities "participating" in a collection of data. In other words, reporting of the problem to a user may be subject to a determination that such a threshold number/percentage has been exceeded. As described in further detail below, such a determination may be carried out by a software entity, e.g. a software entity "participating" in a collection of data.

The (first/second/third) plurality of software entities may comprise one or more designated software entities, e.g. one uniquely designated software entity. The designated software entities may be designated software entities of a plurality of software entities "participating" in a collection of data. As such, the designated software entity/entities may be designated software entities/a uniquely designated software entity of the plurality of software entities that have instigated addition of their respective entity identifier to a collection of data.

The designated software entities may have privileges that software entities that are not designated do not. For example, designated software entities may have exclusive permission to report a problem to a user or to determine whether a threshold percentage (as described above) has been exceeded. Similarly, designated software entities may have exclusive permission to "negotiate" between two collections of data forums, e.g. to establish which of the two should report a problem (shared by both collections/forums) to a user.

As touched upon above, a software entity may be capable of tasks that may be effected on behalf of a plurality of the software entities "participating" in a collection of data. A designated software entity's respective designation may apply to a sub-set of such collection of data/forum tasks. For example, one software entity of a plurality of software entities may be uniquely designated, e.g. have exclusive permission, to report a problem to a user, whereas another software entity of the plurality of software entities may be uniquely designated, e.g. have exclusive permission, to "negotiate" between two collections of data/forums. Similarly, a designated software entity's respective designation may apply to all collection of data/forum tasks. For example, a (single) software entity may be designated/responsible for reporting problems to a user, "negotiating" between collections of data, determining whether a threshold percentage of software entities have reported a common problem, etc.

The designation (of the designated software entities) may be effected in a manner that allows any (one or more or each) of the software entities of the plurality of software entities to respectively determine whether a (given) software entity, e.g. itself, is a/the designated software entity (for a given (set of) task(s)). Similarly, the designation may be effected in a manner that allows the data repository/server to determine if a (given) software entity is a designated software entity (of a (given) plurality of software entities) (for a given (set of) task(s)).

The designated software entity of a plurality of software entities that have instigated addition of their respective entity identifier to a collection of data may be the software entity whose respective entity identifier is the entity identifier least recently added to and not yet removed from the collection of data. As such, the designated software entity may be the "eldest" participant of a collection of data/forum.

As touched upon above, a software entity may be "registered with"/"participate in" more than one collection of data/forum. As such, at least one of a (fourth) plurality of software entities belonging to the second plurality of software entities and to the third plurality of software entities may instigate addition of data to the first collection of data and to the second collection of data. (Both) the data added to the first collection of data and the data added to the second collection of data may comprise data indicative of a problem experienced by a respective software entity (of the (fourth) plurality of software entities). In other words, the data added to the first collection of data may comprise data indicative of a problem experienced by the respective software entity and the data added to the second collection of data may comprise data indicative of the (same) problem experienced by the respective software entity. Again in other words, a (single) problem may be reported to two collections of data/forums.

A (designated) software entity may take measures that prevent one or more other software entities from informing a user of a problem. For example, a software entity 'participating' in one collection of data may prevent any (one or more or all) software entities 'participating' in another collection of data from informing a user of a (common) problem (e.g. a problem reported/common to both collections of data). In this respect, a (designated) software entity may determine whether to take such measures, i.e. may determine which collection of data/forum is responsible/most suitable for informing a user of a problem. Any (one or more or each) of the software entities "participating" in a collection of data that has been determined to be not responsible/suitable for informing a user of a problem may be informed that another collection of data will inform the user of the problem and/or may be informed that the collection of data that they "participate" in will not inform the user of the problem. In the case of hierarchically ordered collections of data/forums, for example, the hierarchically highest-ranking collection of data/forum to which the problem has been reported may be deemed responsible/suitable for informing a user of the problem. Similarly, one collection of data may be deemed responsible/suitable for informing a user of a problem relative to another collection of data if the at least one collection identifier of the one collection of data comprises each of the at least one collection identifier of the another second collection of data. Such a relationship may be implicitly indicative of a hierarchical order. For example, if the at least one collection identifier of the (first) collection of data comprises each of the at least one collection identifier of the (second) collection of data and if the (first) collection of data indicates that a threshold percentage of the (second) plurality of software entities experiences a common problem, then a designated software entity of the second plurality of software entities may inform a user of the common problem and takes measures that prevent a designated software entity of the second plurality of software entities from informing a user of the common problem.

A software entity, e.g. a software entity "participating" in a collection of data such as a software entity of the second plurality of software entities, may receive data indicative of any (one or more or each) of a problem, an action and at least one success criterion, e.g. from a user. The action may be an action aimed at/for solving the problem. The at least one success criterion may be indicative of whether the action has been (successfully) completed. Similarly, the at least one success criterion may be indicative of whether the problem has been solved. The software entity may perform the action and/or evaluate fulfillment of the at least one success criterion. The action may comprise upgrading the software entity, e.g. to a more recent version. The evaluation of fulfillment of the at least one success criterion may comprise performing a task, e.g. a task designated by the at least one success criterion, and determining whether the task completes without error/as expected/as designated by the at least one success criterion.

The software entity may instigate addition of data indicative of any (one or more or each) of the problem, the action, the at least one success criterion and a success indicator to a collection of data, e.g. to a collection of data that has reported the problem and/or to a thread relating to the problem (in which case the problem addressed by the action may be implicit from a subject of the thread). The software entity may be a designated software entity that reported the problem to a user. The success indicator may be indicative of a success of the action, e.g. of fulfillment of the at least one success criterion subsequent to performance of the action. The instigating of addition of data may be subject to fulfillment of the at least one success criterion. The (designated) software entity may instigate communication of the data added to the collection of data to any (one or more or each) other software entity that has reported the problem to the collection of data, i.e. that has added data to the collection of data representative of the problem. The server/data repository may effect such communication. Similarly, the (designated) software entity may instigate a closing and/or archiving of a thread relating/dedicated to the problem, e.g. subsequent to an addition of data indicative of any (one or more or each) of the problem, the action, the at least one success criterion and the success indicator to the thread. In the present context, the term "close" may be understood in the sense that no further data may be added to the thread (per se) (excepting e.g. data necessary/appropriate for archiving the thread).

For example, a software entity of the second plurality of software entities may receive data indicative of a problem, an action and at least one success criterion from a user, perform the action, evaluate fulfillment of the at least one success criterion and, if the at least one success criterion is fulfilled, instigate addition of data indicative of the problem, the action and of a success of the action to the first collection of data.

Any of the software entities may delete a collection of data, e.g. the first/second/third collection of data, from the data repository, e.g. if the (first/second/third) collection of data remains unaltered for a given period of time. Similarly, any of the software entities may close and/or archive a collection of data, e.g. the first/second/third collection of data, e.g. if the (first/second/third) collection of data remains unaltered for a given period of time. In the present context, the term "close" may be understood in the sense that no further data may be added to the collection of data (per se) (excepting e.g. data necessary/appropriate for archiving the collection of data). The software entity may be a software entity operating on the server/constitute a component of the data repository.

Any of the software entities (e.g. the data repository/server, i.e. a software entity of the data repository/server, or a designated software entity of the (respective) collection of data) may delete a collection of data if the number of software entities "participating" in the collection of data is less than a (user specified) threshold number (and the collection of data has exceeded a (user specified) threshold age). In this respect, the software entity may check for such collections of data at regular (user specified) intervals.

Similarly, the data repository/server may prevent (public) establishment of a collection of data in the data repository until a threshold number of software entities have requested to "participate" in the collection of data, e.g. have requested establishment of such a collection of data.

Input/output to the user, e.g. the aforementioned informing of a user/receipt of data from a user, may be effected via the server, e.g. via a software entity operating on the server. For example, input/output to the user may be effected via a graphical user interface of the server/data repository. The user may be permitted to specify the recipient software entities for a (given) user input. For example, the user may be permitted to specify if a user input is to be broadcasted to all software entities interacting with the data repository/server, broadcasted to each software entity "participating" in any (one or more or each) collection of data (specified by the user), broadcasted to all designated software entities/the designated software entity of a collection of data (specified by the user) and/or communicated/multi-casted to a (user) specified set of (one or more) software entities.

While the teachings of the present disclosure have been discussed hereinabove mainly in the form of a system, the teachings may be embodied, mutatis mutandis, in the form of a method, e.g. a method for processing data in a data processor, or a computer program product, as will be appreciated by the person skilled in the art. Such a method may comprise any of the actions disclosed hereinabove, which actions need not be tied to a particular apparatus or element.

DETAILED DESCRIPTION

Figure 1:
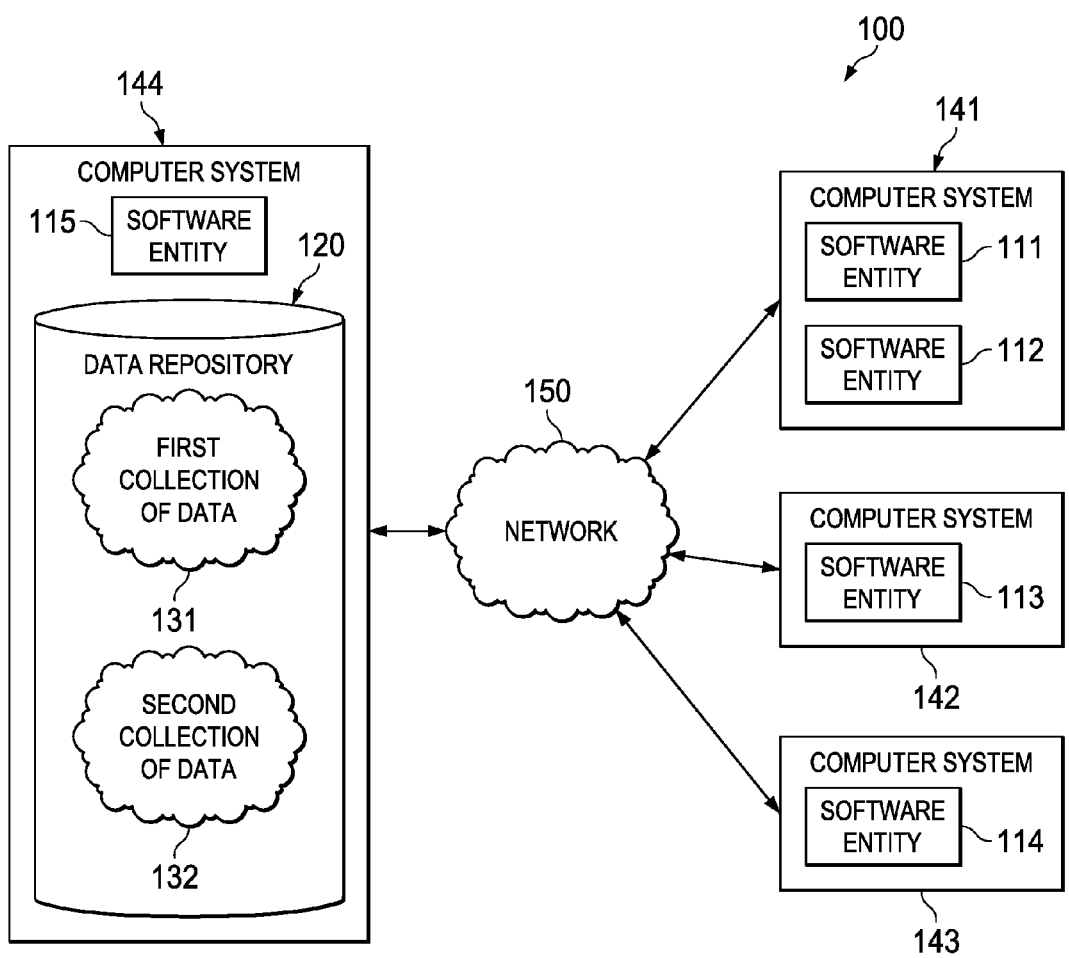
FIG. 1 schematically shows an embodiment of a data communication system in accordance with the present disclosure.

FIG. 1 schematically shows an embodiment of a data communication system 100 in accordance with the present disclosure, e.g. as described above.

In the illustrated embodiment, data communication system 100 comprises a plurality of software entities 111-114 and an optional software entity 115, a data repository 120, a first collection of data 131, an optional second collection of data 132, an optional plurality of computer systems 141-144 and an optional network 150. Software entities 111-114 are agents and software entity 115 is a data repository management application for managing data repository 120. Software entities 111 and 112 are hosted by computer system 141; software entity 113 is hosted by computer system 142; software entity 114 is hosted by computer system 143; and software entity 115 is hosted by computer system 144. Computer system 144 acts as a server for computer systems 141-143, and computer systems 141-143 act as clients for computer system 144. Network 150 provides a bidirectional communication path between any of computer systems 141-144 and the respective software entities 111-115 hosted thereon. However, the system may employ (network) security measures in hardware and/or software such as sandboxing and firewalls that prevent/restrict direct communication among software entities 111-114.

Figure 2:
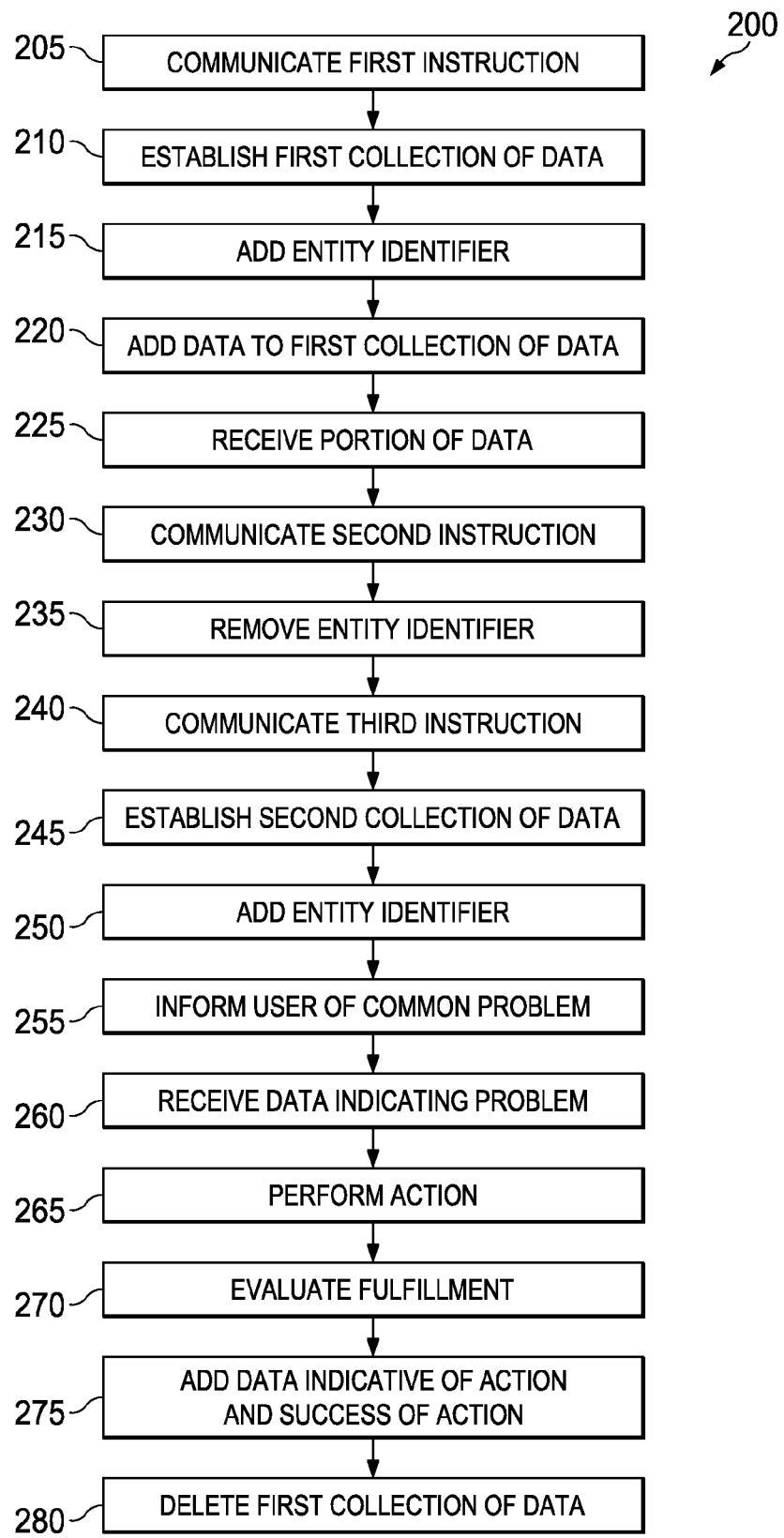
FIG. 2 schematically shows a flow diagram of an embodiment of a data communication method in accordance with the present disclosure.

FIG. 2 schematically shows a flow diagram 200 of an embodiment of a data communication method 200 in accordance with the present disclosure, e.g. as described above.

In the illustrated embodiment, flow diagram 200 comprises a step 205 of communicating a first instruction from a first software entity to a data repository, a step 210 of establishing a first collection of data at a data repository, a step 215 of adding an entity identifier of a software entity to the first collection of data, a step 220 of adding data to the first collection of data, a step 225 of receiving a portion of the (added) data from the first collection of data at another software entity, an optional step 230 of communicating a second instruction from a software entity to the data repository, and optional step 235 of removing the entity identifier from the collection of data, an optional step 240 of communicating a third instruction to the data repository, an optional step 245 of establishing a second collection of data at the data repository, an optional step 250 of adding an entity identifier of a software entity to the second collection of data, an optional step 255 of informing a user of a common problem, an optional step 260 of receiving data indicative of a problem, and action and at least one success criterion from a user, an optional step 265 of performing the action, an optional step 270 of evaluating fulfillment of the at least one success criterion, an optional step 275 of adding data indicative of the action and of a success of the action to the first collection of data and an optional step 280 of deleting the first collection of data.

Figure 3:
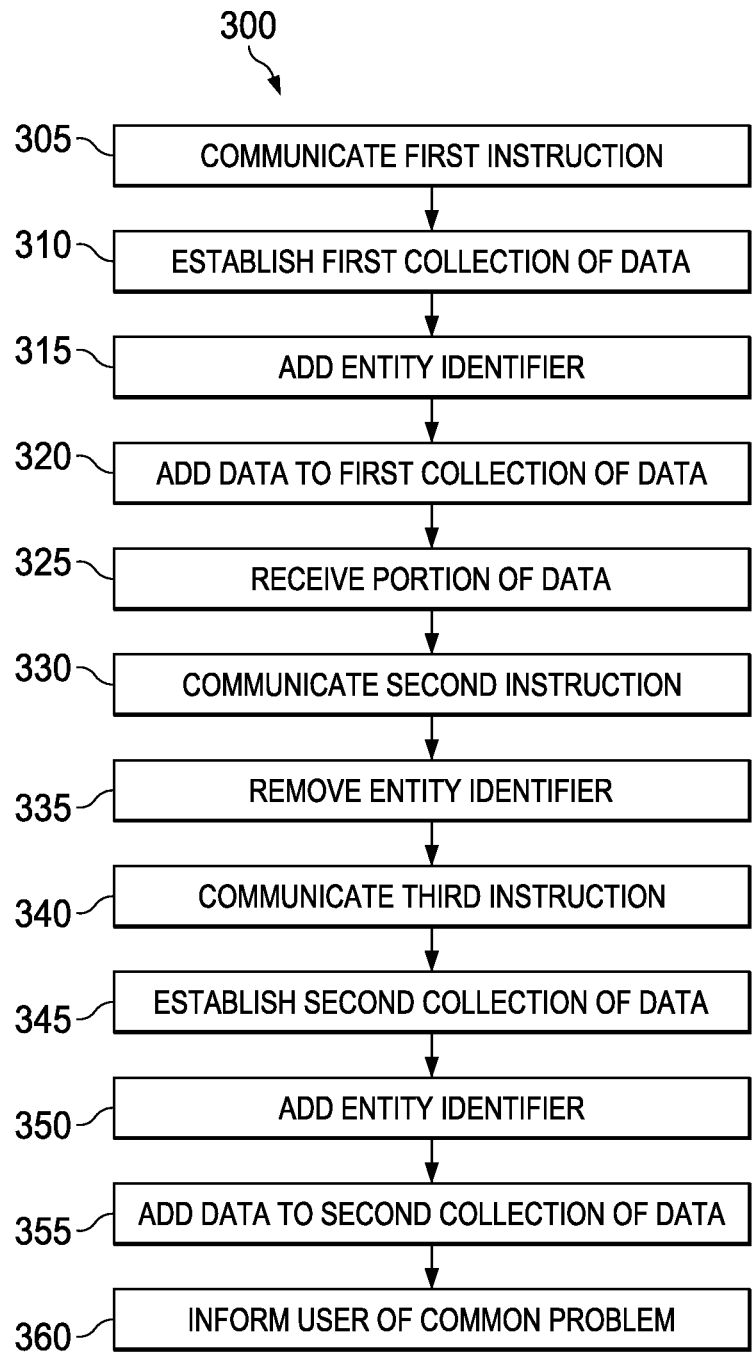
FIG. 3 schematically shows a flow diagram of an embodiment of a data communication method in accordance with the present disclosure.

FIG. 3 schematically shows a flow diagram 300 of an embodiment of a data communication method 200 in accordance with the present disclosure, e.g. as described above.

In the illustrated embodiment, flow diagram 300 comprises a step 305 of communicating a first instruction from a first software entity to a data repository, a step 310 of establishing a first collection of data at a data repository, a step 315 of adding an entity identifier of a software entity to the first collection of data, a step 320 of adding data to the first collection of data, a step 325 of receiving a portion of the (added) data from the first collection of data at another software entity, an optional step 330 of communicating a second instruction from a software entity to the data repository, and optional step 335 of removing the entity identifier from the collection of data, an optional step 340 of communicating a third instruction to the data repository, an optional step 345 of establishing a second collection of data at the data repository, an optional step 350 of adding an entity identifier of a software entity to the second collection of data, an optional step 355 of adding data to the second collection of data and an optional step 360 of informing a user of a common problem.

A further embodiment of a data communication system in accordance with the present disclosure is discussed hereinbelow.

The system may comprise a plurality of software entities in the form of (scanning) agents that may have the following characteristics (also known as "facts") and may be capable of performing the following tasks (i.e. have the following capabilities):

Agent Facts:
  agent version
  scanner component version
  system on which agent is installed
Agent Capabilities:
  perform a software scan
  perform a hardware scan
  upgrade scanner component (requires URL)
The exemplary system comprises four agents.
  Agent1 (7.2.2, scanner 2.7.1010, Linux)
  Agent2 (7.2.1, scanner 2.7.1010, Linux)
  Agent3 (7.2.2, scanner 2.7.1014, Linux)
  Agent4 (7.2.1, scanner 2.7.1010, AIX)

In accordance with a first variant of this exemplary embodiment, all bulletin boards are created automatically without cleanup, e.g. as follows:

Agent1 after installation—connects to server and creates 7 boards:
  Board1: All agents 7.2.2
  Board2: All agents with scanner 2.7.1010
  Board3: All agents on Linux
  Board4: All agents 7.2.2 with scanner 2.7.1010
  Board5: All agents 7.2.2 on Linux
  Board6: All agents with scanner 2.7.1010 on Linux
  Board7: All agents 7.2.2 with scanner 2.7.1010 on Linux
Agent2 after installation—connects to server and joins:
  Board2: All agents with scanner 2.7.1010
  Board3: All agents on Linux
  Board6: All agents with scanner 2.7.1010 on Linux
Agent3 after installation—connects to server and joins:
  Board1: All agents 7.2.2
  Board3: All agents on Linux
  Board5: All agents 7.2.2 on Linux
Agent 4 after installation—connects to server and creates some boards and joins:
  Board2: All agents with scanner 2.7.1010

In accordance with a second variant of this exemplary embodiment, all bulletin boards are created automatically with cleanup. In other words, the second variant is fundamentally the same as the first variant, but the server runs periodical cleanup removing boards in which number of registered agents is less that some predefined amount. In accordance with a third variant of this exemplary embodiment, agents request for creation of board and then the server checks how many agents are interested in participating in this particular forum and if the number exceeds some predefined amount the server creates the forum and sends an invitation to those agents.

Now operation of the exemplary system will be discussed. For the sake of discussion, it is presumed that the software scan is failing on Agent1 and Agent2. The respective agents may report the problem by carrying out the following steps:
1) Agent1 and Agent2 check for threads "Software scan is failing" on all board they are registered/participate in.
2) Agent1 creates a thread "Software scan is failing" on all boards it is registered/participates in; the thread does not yet exist
3) Agent 2 posts a message "I am affected too" on all existing threads "Software scan is failing"
4) "Software scan is failing" is considered a board problem (i.e. a common problem) on Board6 (All agents with scanner 2.7.1010 on Linux), since all the agents in this board reported it
5) Agent1 (the (designated) leader of this board) send a single notification—"scanner in version 2.7.1010 is failing on Linux" with list of affected agents The problem may be resolved using a proof-of-concept request type, e.g. by carrying out the following steps:
1) User sends a message of type proof-of-concept to agent1 (this message contains update scanner to version 2.7.1011 action and successful scan as success indicator)
2) Agent1 performs upgrade of scanner component and, upon successful scan, broadcasts the action to other agents in Board6
3) Agent1 unsubscribes from Board6 (as it no longer shares the characteristic/fact—scanner version 2.7.1010) and subscribes to a new/different board
4) Agent2 performs upgrade of scanner component and accordingly leaves old board to join a new/different one.
5) Board6 remains empty but active for a limited time—in case new agents join and run into the same problem As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/noncompulsoriness. In other words, something that "may" can, but need not.

In the present disclosure, expressions in parentheses are to be understood as being optional. As used in the present disclosure, quotation marks may emphasize that the expression in quotation marks may also be understood in a figurative sense. As used in the present disclosure, quotation marks may identify a particular expression under discussion.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A data communication system comprising:
   a data processor operatively coupled to a memory device;
   a first plurality of software entities, each software entity having a respective entity identifier and a respective plurality of characteristics; and
   a data repository comprising one or more storage devices that store data of the data repository, wherein:
   a first software entity of said first plurality of software entities instigates establishment of a first collection of data at said data repository, said first collection of data having at least one collection identifier selected from said plurality of characteristics of said first software entity, each software entity of a second plurality of said first plurality of software entities having a respective set of said respective plurality of characteristics that matches said at least one collection identifier instigates addition of said respective entity identifier of respective software entity to said first collection of data, at least one of said second plurality of software entities instigates addition of data to said first collection of data; and
   at least one other of said second plurality of software entities obtains a portion of said data from said first collection of data;
   wherein:
   said first software entity instigates establishment of a second collection of data at said data repository, said second collection of data having at least one collection identifier selected from said plurality of characteristics of said first software entity, said at least one collection identifier of said second collection of data differing from said at least one collection identifier of said first collection of data; and
   each software entity of a third plurality of said first plurality of software entities having a respective set of said respective plurality of characteristics that matches said at least one collection identifier of said second collection of data instigates addition of the respective entity identifier of respective software entity to said second collection of data;
   and wherein:
   at least one of a fourth plurality of software entities belonging to said second plurality of software entities and to said third plurality of software entities instigates addition of data to said second collection of data, said data added to said first collection of data comprises data indicative of a problem experienced by a respective software entity of the fourth plurality of software entities, said data added to said second collection of data comprises data indicative of said problem experienced by the respective software entity of the fourth plurality of software entities; and
   if said at least one collection identifier of said first collection of data comprises said at least one collection identifier of said second collection of data and if said first collection of data indicates that a threshold percentage of said second plurality of software entities experiences a common problem, then a designated software entity of said second plurality of software entities informs a user of said common problem and takes measures that prevent a designated software entity of said second plurality of software entities from informing a user of said common problem; and
   wherein said first collection of data is deleted from said data repository if said first collection of data remains unaltered for a given period of time.

2. The system of claim 1, wherein:
   each software entity of said second plurality of software entities, in response to a change in said respective set of characteristics, instigates a removal of said entity identifier of respective software entity from said collection of data if said respective set of characteristics no longer matches said at least one collection identifier.

3. The system of claim 1, wherein:
   a designated software entity of said second plurality of software entities informs a user of a common problem if said first collection of data indicates that a threshold percentage of said second plurality of software entities experiences said common problem.

4. The system of claim 1, wherein:
   a software entity of said second plurality of software entities receives data indicative of the problem, an action and at least one success criterion from a user, performs said action, evaluates fulfillment of said at least one success criterion and, if said at least one success criterion is fulfilled, instigates addition of data indicative of said action and of a success of said action to said first collection of data.

5. The system of claim 1, further comprising:
   a software entity that deletes said first collection of data from said data repository if said first collection of data remains unaltered for a given period of time.

6. A computer-implemented data communication method comprising steps of:
   communicating a first instruction from a first software entity to a data repository, said first software entity having an entity identifier and a plurality of characteristics;
   establishing, in response to said first instruction, a first collection of data at a data repository, said first collection of data having at least one collection identifier selected from said plurality of characteristics;
   adding, for each software entity of a second plurality of software entities having a respective set of characteristics that matches said at least one collection identifier, an entity identifier of respective software entity to said first collection of data;
   adding data from at least one of said second plurality of software entities to said first collection of data;
   receiving, by using a processor, at least one other of said second plurality of software entities, a portion of said data from said first collection of data;
   communicating a third instruction from said first software entity to said data repository;
   establishing, in response to said third instruction, a second collection of data at said data repository, said second collection of data having at least one collection identifier selected from said plurality of characteristics of said first software entity, said at least one collection identifier of said second collection of data differing from said at least one collection identifier of said first collection of data;

adding, for each software entity of a third plurality of software entities having a respective set of characteristics that matches said at least one collection identifier of said second collection of data, an entity identifier of respective software entity to said second collection of data;

adding data to said second collection of data from at least one of a fourth plurality of software entities belonging to said second plurality of software entities and to said third plurality of software entities;

if said at least one collection identifier of said first collection of data comprises said at least one collection identifier of said second collection of data and if said first collection of data indicates that a threshold percentage of said second plurality of software entities experiences a common problem, informing a user of said common problem and taking measures that prevent said second plurality of software entities from informing a user of said common problem, wherein said data added to said first collection of data comprises data indicative of a problem experienced by a respective software entity of the fourth plurality of software entities, and said data added to said second collection of data comprises data indicative of said problem experienced by the respective software entity of the fourth plurality of software entities; and deleting said first collection of data from said data repository if said first collection of data remains unaltered for a given period of time.

7. The method of claim 6, further comprising steps of:

communicating, in response to a change in a respective set of characteristics of a respective software entity of said second plurality of software entities, a second instruction from respective software entity to said data repository if said respective set of characteristics no longer matches said at least one collection identifier; and removing, in response to said second instruction, said entity identifier of respective software entity from said collection of data.

8. The method of claim 6, further comprising a step of:

informing a user of a common problem if said first collection of data indicates that a threshold percentage of said second plurality of software entities experiences said common problem.

9. The method of claim 6, further comprising steps of:

receiving, at a software entity of said second plurality of software entities, data indicative of the problem, an action and at least one success criterion from a user;

performing said action;

evaluating fulfillment of said at least one success criterion; and if said at least one success criterion is fulfilled, adding data indicative of said action and of a success of said action to said first collection of data.

10. A computer program product comprising instructions stored on a non-transitory computer readable medium, said instructions being executable for causing a computer to perform a method, when said instructions are run on said computer, comprising steps of:

communicating a first instruction from a first software entity to a data repository, said first software entity having an entity identifier and a plurality of characteristics;

establishing, in response to said first instruction, a first collection of data at a data repository, said first collection of data having at least one collection identifier selected from said plurality of characteristics;

adding, for each software entity of a second plurality of software entities having a respective set of characteristics that matches said at least one collection identifier, an entity identifier of a respective software entity of said plurality of software entities to said first collection of data;

adding data from at least one of said second plurality of software entities to said first collection of data;

receiving, at least one other of said second plurality of software entities, a portion of said data from said first collection of data;

communicating a third instruction from said first software entity to said data repository;

establishing, in response to said third instruction, a second collection of data at said data repository, said second collection of data having at least one collection identifier selected from said plurality of characteristics of said first software entity, said at least one collection identifier of said second collection of data differing from said at least one collection identifier of said first collection of data;

adding, for each software entity of a third plurality of software entities having a respective set of characteristics that matches said at least one collection identifier of said second collection of data, an entity identifier of respective software entity to said second collection of data;

adding data to said second collection of data from at least one of a fourth plurality of software entities belonging to said second plurality of software entities and to said third plurality of software entities;

if said at least one collection identifier of said first collection of data comprises said at least one collection identifier of said second collection of data and if said first collection of data indicates that a threshold percentage of said second plurality of software entities experiences a common problem, informing a user of said common problem and taking measures that prevent said second plurality of software entities from informing a user of said common problem, wherein said data added to said first collection of data comprises data indicative of a problem experienced by a respective software entity of the fourth plurality of software entities, and said data added to said second collection of data comprises data indicative of said problem experienced by the respective software entity of the fourth plurality of software entities; and deleting said first collection of data from said data repository if said first collection of data remains unaltered for a given period of time.

* * * * *